ness than 12 carbon atoms. These ester groups as known in the steroid art may be saturated or unsaturated, straight or branched chain aliphatic, cyclic or cyclicaliphatic and may be conventionally substituted as by methoxy or halogen. Typical acyl groups are acetate, propionate, butyrate, hemisuccinate, caproate, benzoate, trimethylacetate, cyclopentylpropionate, phenoxypropionate and β-chloropropionate. All of the above compounds are cortical type hormones having a high anti-inflammatory activity together with a minimum of undesirable side effects.

2,997,489
6-CHLORO-16α-HYDROXY STEROIDS OF THE PREGNENE SERIES

Howard J. Ringold, Octavio Mancera, and Fred Allan Kincl, Mexico City, Mexico, assignors to Syntex S.A., Mexico City, Mexico, a corporation of Mexico
No Drawing. Filed Aug. 7, 1958, Ser. No. 753,626
Claims priority, application Mexico Aug. 9, 1957
28 Claims. (Cl. 260—397.45)

The present invention relates to cyclopentanophenanthrene derivatives and to a process for the production thereof.

More particularly the present invention relates to novel 6-chloro - $\Delta^{1,4,6}$ - pregnatrien-16α,17α,21-triol-3,11,20-trione derivatives and 6-chloro-$\Delta^{1,4,6}$-pregnatrien-11β,16α,17α,21-tetrol-3,20-dione derivatives (including those derivatives (including those derivatives having a 9α-chloro or a 9α-fluoro group) as well as to the corresponding $\Delta^4$, $\Delta^{1,4}$ and $\Delta^{4,6}$-compounds constituting novel intermediates for the production of the aforementioned triene derivatives. The present invention also relates to 16,21-diesters of the aforementioned compounds of hydrocarbon carboxylic acids of less than 12 carbon atoms.

In accordance with the present invention it has been discovered that the aforementioned novel compounds may be prepared from the known 16,21-diacetate of $\Delta^4$-pregnen-11β,16α,17α,21-tetrol-3,20-dione or its known 9α-chloro or 9α-fluoro derivatives, by a process to be hereinafter set forth in detail, involving the production of the novel 6α-chloro-$\Delta^4$-pregnen-16α,17α,21-triol-3,11,20-trione or its 16,21-diesters, or 6α-chloro-$\Delta^4$-pregnen-11β,16α,17α,21-tetrol-3,20-dione or its 16,21-diesters. From these intermediates which are themselves potent cortical hormones having anti-inflammatory and other desirable activities characterizing the gluco-corticoids the corresponding $\Delta^{1,4}$, $\Delta^{4,6}$ and $\Delta^{1,4,6}$ compounds were obtained by dehydrogenation as hereinafter described in detail.

The novel potent cortical compounds of the present invention having in their molecule a 6-chlorine as well as a hydroxyl group or esterified hydroxyl at C-16α may be characterized by the following formulas:

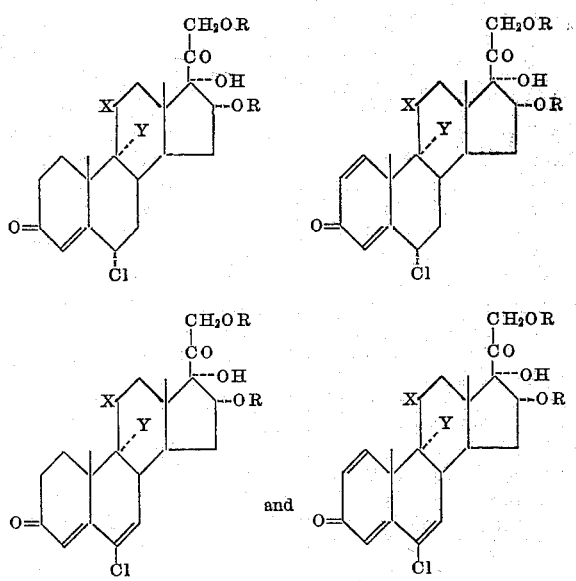

In the above formulas X represents

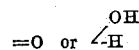

Y represents hydrogen, chlorine or fluorine. R represents hydrogen or a hydrocarbon carboxylic acid acyl group of The production of the novel compounds set forth in the first formula above indicated may be illustrated by the following equations:

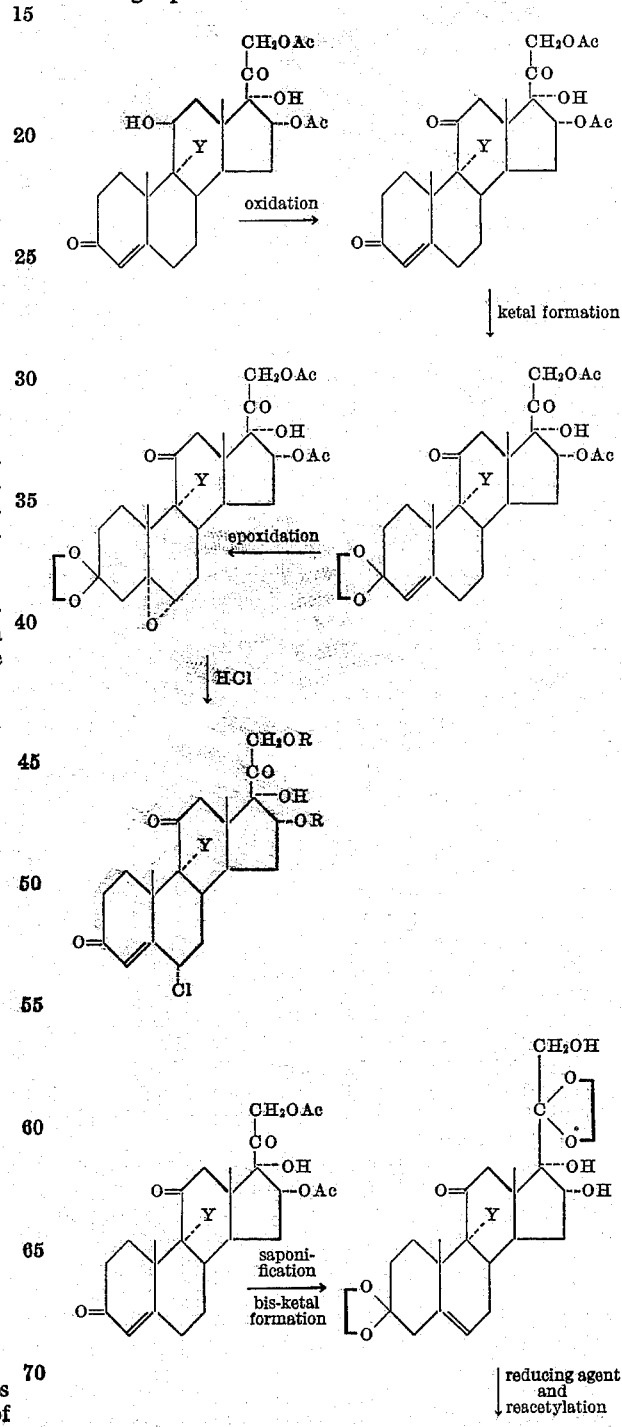

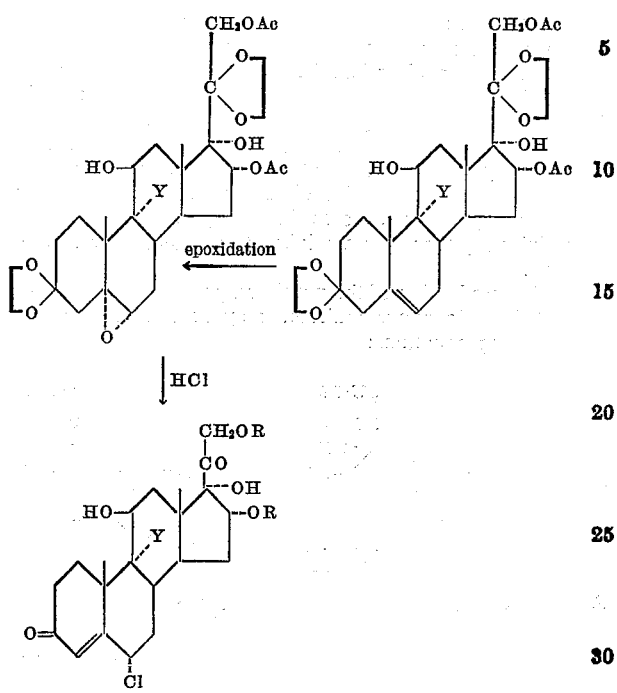

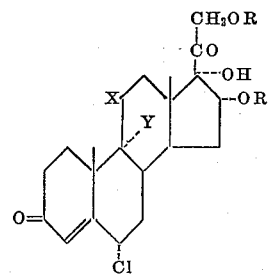

In the above equations Ac represents acetyl, Y and R represent the same groups as heretofore set forth.

In practicing the process outlined in the first equation above, the hydroxy group at C–11 of the starting compound, i.e. the 16,21-diacetate of $\Delta^4$-pregnen-11$\beta$,16$\alpha$,17$\alpha$, 21-tetrol-3,20-dione or its 9$\alpha$-chloro or fluoro derivative, is oxidized as with chromium trioxide in acetic acid to form the corresponding 11-keto compound which also forms the starting material for the process outlined in the second equation. In each case the next step is the formation of a ketal by reaction with ethylene glycol in the presence of catalytic amounts of p-toluenesulfonic acid. However, if the 11$\beta$-hydroxide derivatives are to be the final product as is the case in the second equation the ketal is prepared from the free compound and is a 3,20-bis ketal. Referring to the first of the above equations, the 16,21-diacetate of 3-ethylenedioxy-$\Delta^5$-pregnen-16$\alpha$, 17$\alpha$,21-triol-3,11,20-trione or its 9$\alpha$-chloro or fluoro derivatives are then epoxidized by reaction with an aromatic peracid such as monoperphthalic acid to prepare the corresponding 5$\alpha$,6$\alpha$-oxido derivatives. Treatment of these oxido compounds with dry hydrogen chloride at a temperature substantially below room temperature as for example below 18° C. gave the corresponding 6$\alpha$-chloro compounds indicated in the equation. In this regard it may be noted that in place of the 16$\alpha$,21-diacetate other esters of hydrocarbon carboxylic acids of less than 12 carbon atoms as previously referred to may be used in the process giving directly the corresponding 16$\alpha$,21-diacylates, or the final compound may be conventionally saponified to give the free compounds and these reesterified in a conventional way.

As previously set forth when the 11$\beta$-hydroxy derivatives are to be produced as indicated in the second of the above equations, 3,20-bis ketal are formed. This protection of the 20-keto group then permits reduction of the 11-keto group to an 11$\beta$-hydroxy group by conventional methods using as a reducing agent sodium borohydride, for example. The 11$\beta$-hydroxy compounds thus produced are thereafter reacetylated and the remaining steps of epoxidation, treatment with cold dry hydrogen chloride, saponification etc. are the same as that referred to previously. It will be noted that the final products of both of these equations taken together correspond to compounds of the following formula:

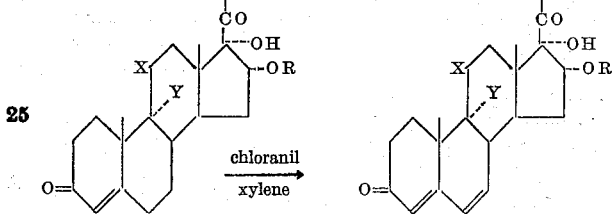

As was previously set forth, these compounds are intermedates for the production of remaining novel hormones of the present invention previously referred to as outlined in the following equation:

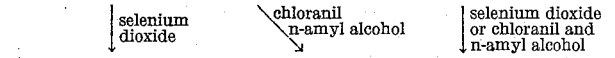

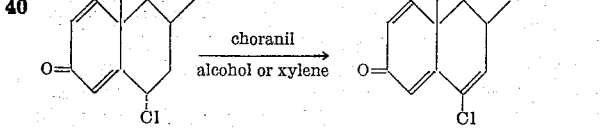

In the above equation X, Y and R represent the same groups as heretofore set forth.

The preferred starting material is one where R represents the acetate radical as for example the 16,21-diacetate of the starting materials indicated. Refluxing with selenium dioxide preferably in admixture with t-butanol in the presence of pyridine gave the corresponding diene compounds, and refluxing these dienes with chloranil in n-amyl alcohol or xylene gave the corresponding diacetates of $\Delta^{1,4,6}$-trienes. These last compounds were also obtained directly from the $\Delta^4$ starting materials by refluxing with chloranil in n-amyl alcohol. Refluxing the $\Delta^4$ starting compounds with chloranil in xylene however, produced the $\Delta^{4,6}$-derivatives indicated which could be transformed to the $\Delta^{1,4,6}$-derivatives by a second treatment with chloranil in n-amyl alcohol or by refluxing with selenium dioxide. As may be understood, other esters of the type previously set forth may be used instead of the acetates and the $\Delta^{4,6}$, $\Delta^{1,4}$ and $\Delta^{1,4,6}$ ester compounds prepared may be conventionally saponified and reesterified.

The following specific examples serve to illustrate but are not intended to limit the present invention.

*Example I*

A stirred solution of 5 g. of the 16,21-diacetate of 9$\alpha$-fluoro-$\Delta^4$-pregnen-11$\beta$,16$\alpha$,17$\alpha$,21-tetrol-3,20-dione in 150 cc. of acetic acid was slowly treated with a solution of 600 mg. of chromic acid in 25 cc. of 80% acetic acid while the temperature was kept below 20° C.; after 2 hours at room temperature, the mixture was poured into ice water and the precipitate was collected, washed with water, dried and recrystallized from acetone-hexane. There was thus obtained the 16,21-diacetate of 9α-fluoro-Δ$^4$-pregnen-16α,17α,21-triol-3,11,20-trione.

A mixture of 5 g. of the above compound, 300 cc. of dry benzene, 35 cc. of ethyleneglycol previously distilled over potassium hydroxide, and 250 mg. of p-toluenesulfonic acid was refluxed for 12 hours with the use of an adapter for the continuous removal of the water formed during the reaction; there was then added 50 cc. of 2 N sodium carbonate solution and 200 cc. of water, and the organic layer was separated, washed with water, dried over anhydrous sodium sulfate and evaporated to dryness under reduced pressure, thus producing the 16,21-diacetate of 9α-fluoro-3-ethylenedioxy-Δ$^5$-pregnen-16α,17α,21-triol-11,20-dione in crude form. Crystallization from acetone containing a small amount of pyridine afforded the pure compound.

4 g. of the above ketal was dissolved in 800 cc. of chloroform and mixed with an ether solution of perphthalic acid containing 1.1 molar equivalents of peracid. The mixture was kept at room temperature for 20 hours, when a titration showed that 0.9 mol of the peracid had been consumed. The solution was washed with three portions of 500 cc. of 5% aqueous sodium carbonate solution and then with water, dried over anhydrous sodium sulfate and evaporated to dryness. The residue was purified by chromatography on ethyl acetate washed alumina to give the 16,21-diacetate of 9α-fluoro-3-ethylenedioxy-5α,6α-oxido-pregnan-16α,17α,21-triol-11,20-dione.

A slow stream of dry hydrogen chloride was introduced into a solution of 5 g. of the above compound in 250 cc. of glacial acetic acid for a period of 2 hours while the temperature was maintained below 18° C. The mixture was then poured into ice water and the reaction product was extracted with methylene dichloride, washed with 5% sodium carbonate solution and water, dried over anhydrous sodium sulfate and evaporated to dryness. Crystallization of the residue from acetone-hexane furnished the 16,21-diacetate of 6α-chloro-9α-fluoro-Δ$^4$-pregnen-16α,17α,21-triol-3,11,20-trione.

A mixture of 1.5 g. of the above Δ$^4$-compound, 2 g. of chloranil and 30 cc. of n-amyl alcohol was refluxed for 16 hours, cooled and diluted with 60 cc. of ether. The solution was successively washed with water, 5% sodium carbonate solution and water, dried over anhydrous sodium sulfate and evaporated to dryness under reduced pressure. Chromatography on ethyl acetate washed alumina yielded the pure 16,21-diacetate of 6-chloro-9α-fluoro-Δ$^{1,4,6}$-pregnatrien-16α,17α,21-triol-3,11,20-trione.

Example II 1.5 g. of the 16,21-diacetate of 6α-chloro-9α-fluoro-Δ$^4$-pregnen-16α,17α,21-triol-3,11,20-trione, obtained in accordance with the method of the previous example, was mixed with 75 cc. of anhydrous t-butanol, 450 mg. of selenium dioxide and 0.2 cc. of pyridine and the mixture was boiled under reflux for 72 hours under an atmosphere of nitrogen. The cooled mixture was diluted with ethyl acetate, filtered through celite and the residue was washed with hot ethyl acetate. The filtrate and washings were combined and evaporated to dryness under reduced pressure. The residue was triturated with water and the precipitate was collected, washed, dried and purified by chromatography on neutral alumina. There was thus obtained the 16,21-diacetate of 6α-chloro-9α-fluoro-Δ$^{1,4}$-pregnadien-16α,17α,21-triol-3,11,20-trione.

1 g. of this diene was refluxed with 1.5 g. of chloranil and 20 cc. of n-amyl alcohol and then the reaction product was worked up by the procedure described in the previous example, thus producing the 16,21-diacetate of 6-chloro-9α-fluoro-Δ$^{1,4,6}$-pregnatrien-16α,17α,21-triol-3,11,20-trione, identical to the one obtained in such example. In another experiment the n-amyl alcohol was substituted by xylene, with the same final result.

Example III

A mixture of 2 g. of the 16,21-diacetate of 6α-chloro-9α-fluoro-Δ$^4$-pregnen-16α,17α,21-triol-3,11,20-trione, obtained by the method of Example I, 1.6 g. of chloranil and 40 cc. of xylene was refluxed for 12 hours, cooled and diluted with ether. The solution was washed with water, 5% sodium carbonate solution and water, dried over anhydrous sodium sulfate and evaporated to dryness under vacuum. The residue was purified by chromatography on neutral alumina to produce the 16,21-diacetate of 6-chloro - 9α-fluoro - Δ$^{4,6}$ - pregnadien - 16α,17α,21 - triol-3,11,20-trione.

1 g. of the above compound was refluxed with 300 mg. of selenium dioxide, 50 cc. of anhydrous t-butanol and 0.2 cc. of pyridine for 70 hours under an atmosphere of nitrogen. The product was then worked up by the procedure described in the previous example. There was thus obtained the 16,21-diacetate of 6-chloro-9α-fluoro - Δ$^{1,4,6}$-pregnatrien - 16α,17α,21 - triol-3,11,20-trione, identical to the final compound obtained in Examples I and II.

Example IV 1 g. of the 16,21-diacetate of 6-chloro-9α-fluoro-Δ$^{4,6}$-pregnadien-16α,17α,21-triol-3,11,20-trione, obtained by the method of the previous example, was treated with chloranil in n-amyl alcohol solution by an analogous method to that described in Example I, to produce the 16,21-diacetate of 6-chloro-9α-fluoro-Δ$^{1,4,6}$-pregnatrien-16α,17α,21-triol-3,11,20-trione, identical to the final products obtained in the previous examples.

Example V

Following the methods described in the previous examples, the 16,21-diacetate of Δ$^4$-pregnen-11β,16α,17α,21-tetrol-3,20-dione was converted into the 16,21-diacetates of 6α-chloro-Δ$^4$-pregnen-16α,17α,21-triol-3,11,20-trione, of 6-chloro-Δ$^{1,4,6}$-pregnatrien-16α,17α,21-triol-3,11, 20-trione, 6α-chloro-Δ$^{1,4}$-pregnadien-16α,17α,21-triol-3, 11,20-trione and of 6-chloro-Δ$^{4,6}$-pregnadien-16α,17α,21-triol-3,11,20-trione, respectively; the 16,21-diacetate of 9α - chloro - Δ$^4$ - pregnen - 11β, 16α,17α,21 - tetrol - 3,20-dione was converted into the 16,21-diacetates of 6α,9α-dichloro-Δ$^4$-pregnen-16α,17α,21-triol-3,11,20-trione, of 6, 9α - dichloro - Δ$^{1,4,6}$ - pregnatrien - 16α,17α,21 - triol - 3, 11,20-trione, of 6α,9α-dichloro-Δ$^{1,4}$-pregnadien-16α,17α, 21-triol-3,11,20-trione and of 6,9α-dichloro-Δ$^{4,6}$-pregnadien-16α,17α,21-triol-3,11,20-trione, respectively.

Example VI

A mixture of 1 g. of the 16,21-diacetate of 6α-chloro-9α-fluoro-Δ$^4$-pregnen-16α,17α,21-triol-3,11,20-trione, obtained in accordance with Example I, and 20 cc. of anhydrous methanol was cooled to 0° C. and treated with a solution of sodium methoxide prepared by dissolving 70 mg. of sodium metal in 5 cc. of anhydrous methanol, under an atmosphere of nitrogen and with stirring. The stirring was continued for half an hour at room temperature and then the mixture was acidified with a few drops of acetic acid and poured into ice water. The precipitate was collected and recrystallized from acetone-hexane, thus yielding the free 6α-chloro-9α-fluoro-Δ$^4$-pregnen-16α,17α,21-triol-3,11,20-trione.

Similarly, there were saponified the acetoxyl groups of the other 6-chloro or 6-chloro-9α-halo compounds described in the previous examples, to obtain the free Δ$^4$, Δ$^{1,4,6}$, Δ$^{1,4}$ and Δ$^{4,6}$-triols.

Example VII

A mixture of 1 g. of 6α-chloro-9α-fluoro-Δ$^{1,4}$-pregnadien-16α,17α,21-triol-3,11,20-trione, obtained in accordance with the method of the previous example, 20 cc. of pyridine and 1 cc. of propionic anhydride was kept overnight at room temperature and then poured into water. The product was extracted with ethyl acetate and the extract was washed with dilute hydrochloric acid, water, 5% sodium carbonate solution and again with water to neutral, dried over anhydrous sodium sulfate and evaporated to dryness. Crystallization of the residue from acetone-hexane furnished the 16,21-dipropionate of 6α-chloro - 9α - fluoro - $\Delta^{1,4}$ - pregnadien - 16α,17α,21 - triol-3,11,20-trione.

Similarly, by conventional reaction with the corresponding anhydrides or chlorides of hydrocarbon carboxylic acids having up to 12 carbon atoms, there were prepared the respective 16,21-diesters of all of the 6-chloro and 6-chloro-9α-halo compounds described in the preceding Examples I to VI. Specifically there were prepared in addition to the acetates and propionates, the dibenzoates and di-cyclopentylpropionates as well as others previously referred to.

*Example VIII*

A solution of 5 g. of the 16,21-diacetate of 9α-fluoro-$\Delta^4$-pregnen-11β,16α,17α,21-tetrol-3,20-dione in 150 cc. of acetic acid was slowly treated with a solution of 600 mg. of chromium trioxide in 25 cc. of 80% acetic acid, while the temperature was maintained below 20° C. After 2 hours at room temperature, the mixture was poured into ice water and the precipitate was collected by filtration, washed with water, dried and recrystallized from acetone-hexane. There was thus obtained the 16,21-diacetate of 9α-fluoro-$\Delta^4$-pregnen-16α,17α,21-triol-3,11,20-trione.

5 g. of this triol-trione diacetate was suspended in 100 cc. of anhydrous methanol and treated under nitrogen with a solution of sodium methoxide prepared by dissolving 350 mg. of sodium in 5 cc. of methanol. After 30 minutes stirring under nitrogen the mixture was neutralized with acetic acid and most of the methanol was removed under vacuum; cold water was added and the precipitate was collected, washed with water, dried and recrystallized from methanol-ether, thus yielding the free 9α-fluoro-$\Delta^4$-pregnen-16α,17α,21-triol-3,11,20-trione.

A mixture of 5 g. of the above compound, 300 cc. of benzene, 35 cc. of ethyleneglycol recently distilled over potassium hydroxide and 250 mg. of p-toluenesulfonic acid was refluxed for 12 hours with the use of an adapter for the continuous removal of the water formed during the reaction. 50 cc. of 2 N sodium carbonate solution and 200 cc. of water were added and the benzene layer was washed with water, dried over anhydrous sodium sulfate, filtered and evaporated to dryness under reduced pressure. There was thus obtained 9α-fluoro-3,20-bis-ethylenedioxy-$\Delta^5$-pregnen-16α,17α,21-triol-11-one in crude form, which was purified by crystallization from acetone containing a little pyridine.

A solution of 5 g. of the above compound in 150 cc. of anhydrous tetrahydrofurane was slowly added to a stirred suspension of 1.5 g. of lithium aluminum hydride in 100 cc. of anhydrous tetrahydrofurane and the mixture was refluxed for 30 minutes. The excess of hydride was decomposed by the addition of a little ethyl acetate and then 15 cc. of saturated sodium sulfate solution was added followed by the addition of anhydrous sodium sulfate. The solution was filtered and evaporated to dryness. Crystallization of the residue from acetone-ether furnished 9α-fluoro-3,20-bis-ethylenedioxy-$\Delta^5$ - pregnen - 11β, 16α,17α,21-tetrol.

A mixture of 4 g. of the above bis-ketal, 30 cc. of pyridine and 6 cc. of acetic anhydride was kept standing for 12 hours, poured into water and extracted with ethyl acetate. The extract was washed with water, dilute hydrochloric acid, sodium bicarbonate solution and water, dried over anhydrous sodium sulfate and evaporated to dryness. Crystallization of the residue from ether-hexane afforded the 16,21-diacetate of 9α-fluoro-3,20-bis-ethylenedioxy-$\Delta^5$-pregnen-11β,16α,17α,21-tetrol.

5 g. of this diketal diacetate of the tetrol was dissolved in 800 cc. of chloroform and mixed with an ether solution of monoperphthalic acid containing 1.2 molar equivalents of the peracid. After 20 hours at room temperature a titration of the mixture showed that the equivalent of 1.0 mol of the peracid had been consumed. The solution was washed thrice with 500 cc. of 5% aqueous sodium carbonate solution and water, dried over anhydrous sodium sulfate and evaporated to dryness. The residue was purified by chromatography on neutral alumina to give the 16,21-diacetate of 9α-fluoro-3,20-bis-ethylenedioxy-5α, 6α-oxido-pregnan-11β,16α,17α,21-tetrol.

5 g. of the above compound was dissolved in 250 cc. of glacial acetic acetic and a slow stream of dry hydrogen chloride was introduced into the solution for 2 hours while the temperature was kept below 15° C. The mixture was poured into ice water, extracted with methylene dichloride and the extract was washed with water, dried over anhydrous sodium sulfate and evaporated to dryness. Two crystallizations of the residue from acetone-hexane yielded the 16,21-diacetate of 6α-chloro-9α-fluoro-$\Delta^4$-pregnen-11β,16α,17α,21-tetrol-3,20-dione.

A mixture of 1.5 g. of the above $\Delta^4$-compound, 2 g. of chloranil and 30 cc. of anhydrous n-amyl alcohol was refluxed for 16 hours, cooled and diluted with 60 cc. of ether. The solution was successively washed with water, 5% sodium carbonate solution and water, dried over anhydrous sodium sulfate, filtered and evaporated to dryness under reduced pressure. Chromatography of the residue on neutral alumina furnished the 16,21-diacetate of 6 - chloro - 9α-fluoro-$\Delta^{1,4,6}$-pregnatrien-11β,16α,17α,21-tetrol-3,20-dione in pure form.

*Example IX*

1.5 g. of the 16,21-diacetate of 6α-chloro-$\Delta^4$-pregnen-11β,16α,17α,21-tetrol-3,20-dione, obtained in accordance with the previous example, was mixed with 75 cc. of anhydrous t-butanol, 0.45 g. of selenium dioxide and 0.3 cc. of pyridine and the mixture was refluxed for 70 hours under an atmosphere of nitrogen. After cooling it was diluted with ethyl acetate and filtered through celite, washing the filter with hot ethyl acetate. The combined filtrate and washings was evaporated to dryness under reduced pressure and the residue triturated with water, filtered, dried and purified by chromatography on neutral alumina. There was thus obtained the 16,21-diacetate of 6α-chloro-9α-fluoro-$\Delta^{1,4}$-pregnadiene-11β,16α,17α,21 - tetrol-3,20-dione.

1.4 g. of this 1,4-diene was treated with 1.5 g. of chloranil and 20 cc. of n-amyl alcohol under reflux. The product was worked up such as has been described in the previous example, thus producing the 16-21-diacetate of 6-chloro-9α-fluoro - $\Delta^{1,4,6}$ - pregnatarien - 11β,16α,17α,21 - tetrol-3,20-dione, identical to the final product obtained in Example VIII.

In another experiment the n-amyl alcohol was substituted by xylene, with the same final result.

*Example X*

A mixture of 2 g. of the 16,21-diacetate of 6α-chloro-9α-fluoro-$\Delta^4$-pregnen-11β,16α,17α,21-tetrol-3,20-dione, obtained by the method of Example I, 16. g. of chloranil and 40 cc. of xylene was refluxed for 2 hours, cooled and diluted with ether. The solution was washed with water, 5% sodium carbonate solution and water, dried over anhydrous sodium sulfate, filtered and evaporated to dryness under reduced pressure. The residue was purified by chromatography on neutral alumina, to produce the 16,21-diacetate of 6-chloro-9α-fluoro-$\Delta^{4,6}$-pregnadien-11β, 16α,17α,21-tetrol-3,20-dione.

1 g. of the above diene was refluxed with 300 mg. of selenium dioxide, 50 cc of t-butanol and 0.2 cc. of pyridine for 70 hours under an atmosphere of nitrogen. The reaction product was worked up such as has been described in the previous example. There was thus obtained the 16,21-diacetate of 6-chloro-9α-fluoro-$\Delta^{1,4,6}$-pregnatrien-11β,16α,17α,21-tetrol-3,20-dione, identical to the final compound of Examples VIII and IX.

Example XI 1 g. of the 16,21-diacetate of 6-chloro-9α-fluoro-Δ⁴,⁶-pregnadien-11β,16α,17α,21-tetrol-3,20-dione, obtained in accordance with the previous example, was treated with chloranil in n-amyl alcohol, following the procedure described in Example VIII, to produce the 16,21-diacetate of 6-chloro-9α-fluoro-Δ¹,⁴,⁶-pregnatrien-11β,16α,17α,21-tetrol-3,20 dione, identical to the one obtained as final product in accordance with the methods of the previous examples.

Example XII

Following the procedure described in the previous examples, the 16,21-diacetate of Δ⁴-pregnen-11β,16α,17α,21-tetrol-3,20-dione was converted into the 16,21-diacetates of 6α-chloro-Δ⁴-pregnen-11β,16α,17α,21-tetrol-3,20-dione, of 6-chloro-Δ¹,⁴,⁶-pregnatrien-11β,16α,17α,21-tetrol-3,20-dione, of 6α-chloro-Δ¹,⁴-pregnadien-11β,16α,17α,21-tetrol-3,20-dione and of 6-chloro-Δ⁴,⁶-pregnadien-11β,16α,17α,21-tetrol-3,20-dione, respectively; the 16,21-diacetate of 9α-chloro-Δ⁴-pregnen-11β,16α,17α,21-tetrol-3,20-dione was converted into the 16,21-diacetates of 6α,9α-dichloro-Δ⁴-pregnen-11β,16α,17α,21-tetrol-3,20-dione, of 6α,9α-dichloro-Δ¹,⁴-pregnadien-11β,16α,17α,21-tetrol-3,20-dione, of 6,9α-dichloro-Δ¹,⁴,⁶-pregnatrien-11β,16α,17α,21-tetrol-3,20-dione and of 6,9α-dichloro-Δ⁴,⁶-pregnadien-11β,16α,17α,21-tetrol-3,20-dione, respectively.

Example XIII

A mixture of 1 g. of the 16,21-diacetate of 6α-chloro-9α-fluoro-Δ⁴-pregnen-11β,16α,17α,21-tetrol-3,20-dione, obtained in accordance with Example VII, and 20 cc. of anhydrous methanol was cooled and mixed with stirring under an atmosphere of nitrogen with a solution of sodium methoxide prepared by dissolving 70 mg. of sodium metal in 5 cc. of anhydrous methanol. The stirring was continued for half an hour at room temperature and then the solution was acidified with a few drops of acetic acid and poured into ice water. The precipitate formed was collected by filtration and recrystallized from acetone-hexane, thus giving the free 6α-chloro-9α-fluoro-Δ⁴-pregnen-11β,16α,17α,21-tetrol-3,20-dione.

By the same method there was hydrolyzed the acetoxyl groups of all of the other 6-chloro and 6-chloro-9α-halo compounds described in the previous Examples VIII to XII, to form the corresponding free Δ⁴, Δ¹,⁴ and Δ¹,⁴,⁶-tetrols.

Example XIV

A mixture of 1 g. of 6α-chloro-9α-fluoro-Δ¹,⁴-pregnadien-11β,16α,17α,21-tetrol-3,20-dione, obtained in accordance with the previous example, 20 cc. of pyridine and 1 cc. of propionic anhydride was allowed to stand overnight at room temperature and then poured into water. The reaction product was extracted with ethyl acetate, washed with dilute hydrochloric acid, water, 5% sodium carbonate solution and again with water, dried over anhydrous sodium sulfate and evaporated to dryness. Recrystallization of the residue from acetone-hexane furnished the 16,21-dipropionate of 6α-chloro-9α-fluoro-Δ¹,⁴-pregnadien-11β,16α,17α,21-tetrol-3,20-dione.

Similarly, by conventional reaction with other anhydrides or chlorides of hydrocarbon carboxylic acids of up to 12 carbon atoms there were prepared the corresponding 16,21-diesters of all of the 6-chloro and 6-chloro-9α-halo compounds described in the preceding Examples VIII to XIII. Specifically there were prepared in addition to the acetates and propionates, the di-benzoates and di-cyclopentylpropionates as well as others previously referred to.

We claim:

1. Compounds of the following formula:

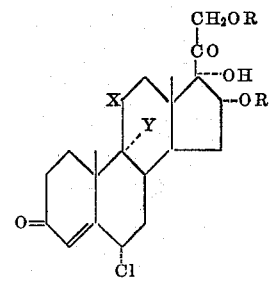

wherein X is selected from the group consisting of

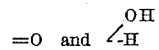

Y is selected from the group consisting of hydrogen, chlorine and fluorine and R is the same in both instances and is selected from the group consisting of hydrogen and a hydrocarbon carboxylic acyl group of up to 12 carbon atoms.

2. 6α-chloro-Δ⁴-pregnen-16α,17α,21-triol-3,11,20-trione.

3. The hydrocarbon carboxylic acid 16,21-diesters of up to 12 carbon atoms of 6α-chloro-Δ⁴-pregnen-16α,17α,21-triol-3,11,20-trione.

4. 6α,9α-dichloro-Δ⁴-pregnen-16α,17α,21-triol-3,11,20-trione.

5. The hydrocarbon carboxylic acid 16,21-diesters of up to 12 carbon atoms of 6α,9α-dichloro-Δ⁴-pregnen-16α,17α,21-triol-3,11,20-trione.

6. 6α-chloro-9α-fluoro-Δ⁴-pregnen-16α,17α,21-triol-3,11,20-trione.

7. The hydrocarbon carboxylic acid 16,21-diesters of up to 12 carbon atoms of 6α-chloro-9α-fluoro-Δ⁴-pregnen-16α,17α,21-triol-3,11,20-trione.

8. Compounds of the following formula:

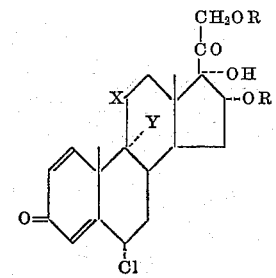

wherein X is selected from the group consisting of

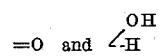

Y is selected from the group consisting of hydrogen, chlorine and fluorine and R is the same in both instances and is selected from the group consisting of hydrogen and a hydrocarbon carboxylic acyl group of up to 12 carbon atoms.

9. 6α-chloro-Δ¹,⁴-pregnadien-16α,17α,21-triol-3,11,20-trione.

10. The hydrocarbon carboxylic acid 16,21-diesters of up to 12 carbon atoms of 6α-chloro-Δ¹,⁴-pregnadien-16α,17α,21-triol-3,11,20-trione.

11. 6α,9α-dichloro-Δ¹,⁴-pregnadien-16α,17α,21-triol-3,11,20-trione.

12. The hydrocarbon carboxylic acid 16,21-diesters of up to 12 carbon atoms of 6α,9α-dichloro-Δ¹,⁴-pregnadien-16α,17α,21-triol-3,11,20-trione.

13. 6α-chloro-9α-fluoro-Δ¹,⁴-pregnadien-16α,17α,21-triol-3,11,20-trione.

14. The hydrocarbon carboxylic acid 16,21-diesters of up to 12 carbon atoms of 6α-chloro-9α-fluoro-Δ¹,⁴-pregnadien-16α,17α,21-triol-3,11,20-trione.

15. Compounds of the following formula:

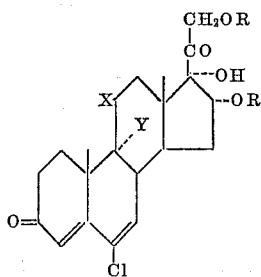

wherein X is selected from the group consisting of

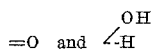

Y is selected from the group consisting of hydrogen, chlorine and fluorine and R is the same in both instances and is selected from the group consisting of hydrogen and a hydrocarbon carboxylic acyl group of up to 12 carbon atoms.

16. 6-chloro - $\Delta^{4,6}$-pregnadien-16$\alpha$,17$\alpha$,21-triol-3,11,20-trione.

17. The hydrocarbon carboxylic acid 16,21-diesters of up to 12 carbon atoms of 6-chloro-$\Delta^{4,6}$-pregnadien-16$\alpha$,17$\alpha$,21-triol-3,11,20-trione.

18. 6,9$\alpha$-dichloro-$\Delta^{4,6}$-pregnadien - 16$\alpha$,17$\alpha$,21 - triol-3,11,20-trione.

19. The hydrocarbon carboxylic acid 16,21-diesters of up to 12 carbon atoms of 6,9$\alpha$-dichloro-$\Delta^{4,6}$-pregnadien-16$\alpha$,17$\alpha$,21-triol-3,11,20-trione.

20. 6-chloro-9$\alpha$-fluoro-$\Delta^{4,6}$-pregnadien-16$\alpha$,17$\alpha$,21-triol-3,11,20-trione.

21. The hydrocarbon carboxylic acid 16,21-diesters of up to 12 carbon atoms of 6-chloro-9$\alpha$-fluoro-$\Delta^{4,6}$-pregnadien-16$\alpha$,17$\alpha$,21-triol-3,11,20-trione.

22. Compounds of the following formula:

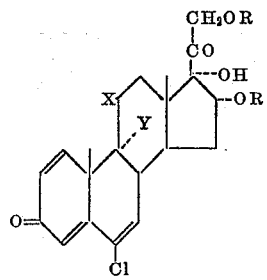

wherein X is selected from the group consisting of

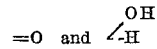

Y is selected from the group consisting of hydrogen, chlorine and fluorine and R is the same in both instances and is selected from the group consisting of hydrogen and a hydrocarbon carboxylic acyl group of up to 12 carbon atoms.

23. 6-chloro-$\Delta^{1,4,6}$-pregnatrien-16$\alpha$,17$\alpha$,21-triol-3,11,20-trione.

24. The hydrocarbon carboxylic acid 16,21-diesters of up to 12 carbon atoms of 6-chloro-$\Delta^{1,4,6}$-pregnatrien-16$\alpha$,17$\alpha$,21-triol-3,11,20-trione.

25. 6,9$\alpha$-dichloro-$\Delta^{1,4,6}$ - pregnatrien - 16$\alpha$,17$\alpha$,21 - triol-3,11,20-trione.

26. The hydrocarbon carboxylic acid 16,21-diesters of up to 12 carbon atoms of 6,9$\alpha$-dichloro-$\Delta^{1,4,6}$-pregnatrien-16$\alpha$,17$\alpha$,21-triol-3,11,20-trione.

27. 6-chloro-9$\alpha$-fluoro - $\Delta^{1,4,6}$ - pregnatrien - 16$\alpha$,17$\alpha$,21-triol-3,11,20-trione.

28. The hydrocarbon carboxylic acid 16,21-diesters of up to 12 carbon atoms of 6-chloro-9$\alpha$-fluoro-$\Delta^{1,4,6}$-pregnatrien-16$\alpha$,17$\alpha$,21-triol-3,11,20-trione.

References Cited in the file of this patent
UNITED STATES PATENTS

| | | |
|---|---|---|
| 2,814,631 | Gould | Nov. 26, 1957 |
| 2,838,546 | Magerlein et al. | June 10, 1958 |
| 2,838,548 | Magerlein et al. | June 10, 1958 |
| 2,881,168 | Spero | Apr. 7, 1959 |